(12) United States Patent
Porret et al.

(10) Patent No.: US 12,065,722 B2
(45) Date of Patent: Aug. 20, 2024

(54) METAL MATRIX COMPOSITE MATERIAL AND METHOD OF MANUFACTURING SAME

(71) Applicant: The Swatch Group Research and Development Ltd, Marin (CH)

(72) Inventors: Joel Porret, Marin-Epagnier (CH); Yves Winkler, Schmitten (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/669,616

(22) Filed: Oct. 31, 2019

(65) Prior Publication Data

US 2020/0157009 A1    May 21, 2020

(30) Foreign Application Priority Data

Nov. 16, 2018    (EP) .................................... 18206669

(51) Int. Cl.
*C22C 32/00*    (2006.01)
*C04B 35/101*    (2006.01)
(Continued)

(52) U.S. Cl.
CPC ...... *C22C 32/0021* (2013.01); *C04B 35/1015* (2013.01); *C04B 35/106* (2013.01);
(Continued)

(58) Field of Classification Search
CPC .............. B22F 2301/00; B22F 2301/05; B22F 2301/052; B22F 2301/054;
(Continued)

(56) References Cited

U.S. PATENT DOCUMENTS 5,145,506 A * 9/1992 Goldstein ........... C22C 32/0052
419/17
5,682,595 A * 10/1997 Gonseth .................. C22C 29/02
428/568
(Continued)

FOREIGN PATENT DOCUMENTS

CN    102015163 A    4/2011
CN    102686754 A    9/2012
(Continued)

OTHER PUBLICATIONS

"Glossary of Metallurgical and Metalworking Terms," Metals Handbook, ASM Handbooks Online, ASM International, 2002, pp. 1, 210, 257. (Year: 2002).*
(Continued)

*Primary Examiner* — Vanessa T. Luk
(74) *Attorney, Agent, or Firm* — Oblon, McClelland, Maier & Neustadt, L.L.P.

(57) ABSTRACT

A composite material having a grainy appearance, this composite material including a metal matrix which represents, in terms of volume fraction, between 50 and 95% of the grainy composite material, the ceramic particles having a diameter that lies in the range 0.1 to 2 mm and which represent, in terms of volume fraction, between 50 and 5% of the composite material are dispersed in the metal matrix and form the remainder of this grainy composite material. A method for manufacturing a grainy synthetic material.

23 Claims, 5 Drawing Sheets

(51) Int. Cl.
  *C04B 35/106* (2006.01)
  *C04B 35/14* (2006.01)
  *C04B 35/44* (2006.01)
  *C04B 35/56* (2006.01)
  *C04B 35/565* (2006.01)
  *C04B 35/58* (2006.01)
  *C04B 35/584* (2006.01)

(52) U.S. Cl.
  CPC .............. *C04B 35/14* (2013.01); *C04B 35/44* (2013.01); *C04B 35/5611* (2013.01); *C04B 35/565* (2013.01); *C04B 35/58071* (2013.01); *C04B 35/58078* (2013.01); *C04B 35/584* (2013.01); *C22C 32/00* (2013.01); *C22C 32/0026* (2013.01); *C04B 2235/786* (2013.01)

(58) Field of Classification Search
  CPC .......... B22F 2301/056; B22F 2301/058; B22F 2301/10; B22F 2301/15; B22F 2301/155; B22F 2301/20; B22F 2301/205; B22F 2301/25; B22F 2301/255; B22F 2301/30; B22F 2301/35; B22F 2301/355; B22F 2301/40; B22F 2301/45; B22F 2302/00; B22F 2302/05; B22F 2302/10; B22F 2302/105; B22F 2302/15; B22F 2302/20; B22F 2302/205; B22F 2302/25; B22F 2302/253; B22F 2302/256; B22F 2302/30; B22F 2302/35; B22F 2302/40; B22F 2302/403; B22F 2302/406; B22F 2302/45; B22F 2304/10; C21D 2211/00; C22C 1/05; C22C 1/051; C22C 1/053; C22C 1/055; C22C 1/056; C22C 1/058; C22C 26/00; C22C 2026/005; C22C 2026/006; C22C 2026/007; C22C 2026/008; C22C 29/00; C22C 29/005; C22C 29/02; C22C 29/04; C22C 29/06; C22C 29/062; C22C 29/065; C22C 29/067; C22C 29/08; C22C 29/10; C22C 29/12; C22C 29/14; C22C 29/16; C22C 29/18; C22C 32/00; C22C 32/0005; C22C 32/001; C22C 32/0015; C22C 32/0021; C22C 32/0026; C22C 32/0031; C22C 32/0036; C22C 32/0042; C22C 32/0047; C22C 32/0052; C22C 32/0057; C22C 32/0063; C22C 32/0068; C22C 32/0073; C22C 32/0078; C22C 32/0084; C22C 32/0089; C22C 32/0094; C22C 1/0458; C22C 14/00; A44C 27/001; A44C 27/002; A44C 27/003; A44C 27/006; G04B 37/22; G04B 37/221

See application file for complete search history.

(56) References Cited

U.S. PATENT DOCUMENTS

| | | | |
|---|---|---|---|
| 2005/0073222 A1* | 4/2005 | Kampe | H01L 41/183 310/358 |
| 2006/0147333 A1 | 7/2006 | Moxson et al. | |
| 2008/0029186 A1* | 2/2008 | Abkowitz | A61L 27/06 148/407 |
| 2010/0021721 A1* | 1/2010 | Werler | C22C 1/1068 164/1 |
| 2010/0316193 A1 | 12/2010 | Roedhammer et al. | |
| 2011/0159216 A1* | 6/2011 | Millar | C22C 1/05 428/34.1 |
| 2014/0361670 A1* | 12/2014 | Prest | C22C 29/005 419/11 |
| 2017/0028477 A1* | 2/2017 | Setna | B22F 1/025 |
| 2017/0043347 A1* | 2/2017 | Berglund | B22F 1/0003 |
| 2017/0088923 A1* | 3/2017 | Porret | A44C 27/003 |
| 2017/0327701 A1* | 11/2017 | Connor | B22F 3/24 |
| 2018/0327318 A1* | 11/2018 | Buttet | C09K 11/025 |

FOREIGN PATENT DOCUMENTS

| | | | | |
|---|---|---|---|---|
| CN | 107532012 A | | 1/2018 | |
| CN | 109014192 A | * | 12/2018 | ............. B22C 1/181 |
| JP | 2000-26902 A | | 1/2000 | |
| JP | 2002-371303 A | | 12/2002 | |
| JP | 2008-136862 A | | 6/2008 | |
| WO | WO 2015/061817 A2 | | 5/2015 | |
| WO | WO-2015061817 A2 | * | 5/2015 | ............... C22C 1/00 |
| WO | WO-2016113422 A1 | * | 7/2016 | ............ C04B 35/443 |

OTHER PUBLICATIONS

Human Translation of WO 2015/061817 A2 to Erich Neubauer et al., originally published May 7, 2015, translation obtained on Nov. 2023. (Year: 2023).*
European Search Report issued Jun. 28, 2019 in European Application 18206669.6 filed Nov. 16, 2018 (with English Translation of Categories of Cited Documents).
Chao, G. et al., "Efficient drilling of holes in $Al_2O_3$ armor ceramic using impregnated diamond bits," Journal of Materials Processing Technology, vol. 211, May 18, 2011, pp. 1719-1728.
Japanese Office Action issued Dec. 1, 2020 in Japanese Patent Application No. 2019-204466 (with English translation), 13 pages.
Combined Chinese Office Action and Search Report issued Apr. 27, 2021 in Chinese Patent Application No. 201911117412.2 (with English translation), 18 pages.

* cited by examiner

METAL MATRIX COMPOSITE MATERIAL AND METHOD OF MANUFACTURING SAME

CROSS-REFERENCE TO RELATED APPLICATION

This application claims priority to European Patent Application No. 18206669.6 filed on Nov. 16, 2018, the entire disclosure of which is hereby incorporated herein by reference.

TECHNICAL FIELD OF THE INVENTION

The present invention relates to a metal matrix composite material. The invention further relates to a method for manufacturing such a material.

BACKGROUND ART

Metal matrix composite materials are currently used in numerous fields, in particular because the mechanical and chemical properties thereof are the result of an excellent compromise between the intrinsic physical-chemical properties of the elements comprised therein. For example in the horological field, metal matrix composite materials reinforced with ceramic particles—which materials are also known as cermet—are used to produce external elements such as watch cases or bezels. To the naked eye, these external elements have a uniform visual appearance as a result of the small dimensions of the ceramic particles used—generally less than 10 μm—and of the volume fraction of these ceramic particles, which is generally greater than 80%.

Natural grainy materials such as granite, in particular used to produce decorative elements in the fields of art or construction, have also already been used in the horological and jewellery fields. For the purposes of illustration, mention is made of the watch marketed by the Swiss company Tissot under the trade name Rock Watch®. Such materials, owing to the grainy structure thereof, give an original and surprising appearance, for example to the external elements of a watch. Nonetheless, such materials are very hard and the machining thereof, in particular by grinding, directly in the solid material, is long and expensive.

In order to overcome these drawbacks, composite materials having a grainy appearance have been obtained by synthesis. Similarly to natural grainy materials, grainy composite materials are used in art and construction. These grainy composite materials are, for example, obtained by combining a polymer binder with ceramic particles. Thanks to the presence of the polymer binder, these grainy composite materials can be easily profiled, for example by moulding. However, since the volume fraction of the polymer binder is high, these grainy composite materials are relatively soft and tend to deteriorate over time, in particular under the effect of light and temperature. Examples of grainy composite materials include polymer concrete and reconstituted granite, also known as synthetic granite.

Other well-known examples of synthetic composite materials having a grainy appearance are obtained by combining ceramic particles with a mineral binder such as cement, plaster, lime, slags or clay. These grainy composite materials such as concrete can, by wisely choosing the nature, grain size and volume fraction of the ceramic particles thereof, be used to manufacture decorative elements. However, these decorative elements are relatively fragile and cannot be produced by moulding at a high rate and in large numbers since the shaping thereof takes place by casting the composite material in a mould and the binder is relatively slow to harden.

There is thus a need in the prior art for a composite material having a grainy appearance, whose implementation is easy and enables, inter alia, external elements to be produced for timepieces and jewellery.

SUMMARY OF THE INVENTION

For this purpose, the present invention relates to a composite material having a grainy appearance, this composite material comprising a metal matrix which represents, in terms of volume fraction, between 50 and 95% of the grainy composite material, wherein ceramic particles having a diameter that lies in the range 0.1 to 2 mm and which represent, in terms of volume fraction, between 50 and 5% of the composite material, are dispersed in the metal matrix and form the remainder of this grainy composite material.

According to one specific embodiment of the invention, the metal matrix is obtained from a metal powder formed by a plurality of particles having a D90 value of a cumulative function which is less than 100 μm.

According to another specific embodiment of the invention, the metal matrix is chosen from the group consisting of austenitic stainless steels, titanium alloys, precious metal alloys, copper alloys and aluminium alloys.

According to yet another specific embodiment of the invention, the precious metal is chosen from the group consisting of gold, silver, platinum and palladium.

According to yet another specific embodiment of the invention, the ceramic particles represent, in terms of volume fraction, between 50 and 5% of the composite material, and the diameter thereof lies in the range 0.2 to 2 mm.

According to yet another specific embodiment of the invention, the ceramic particles represent, in terms of volume fraction, between 50 and 5% of the composite material, and the diameter thereof lies in the range 0.25 to 0.75 mm.

According to yet another specific embodiment of the invention, the ceramic particles represent, in terms of volume fraction, between 30 and 5% of the composite material, and the diameter thereof lies in the range 0.25 to 0.75 mm.

According to yet another specific embodiment of the invention, the ceramic particles represent, in terms of volume fraction, between 20 and 10% of the composite material, and the diameter thereof lies in the range 0.25 to 0.75 mm.

According to yet another specific embodiment of the invention, the ceramic particles are obtained from a natural material or from a synthetic material.

According to yet another specific embodiment of the invention, the ceramic particles are chosen from the group consisting of aluminium oxides, silicon oxides, zirconium oxides, titanium oxides, diamond, silicon carbides, silicon nitrides, titanium carbides, titanium borides and zirconium borides.

According to yet another specific embodiment of the invention, the ceramic particles are chosen from the group consisting of corundums and silicates.

According to yet another specific embodiment of the invention, the grainy composite material is obtained from a mixture of a metal powder and luminescent inorganic particles based on rare earth aluminates, rare earth silicates or doped strontium aluminates.

According to yet another embodiment of the invention, the composite material is formed by a stainless steel 1.4435 powder of particles, 90% thereof having a particle size of less than 22 μm, and by a 15% volume fraction of europium- and/or dysprosium-doped strontium aluminate particles, the particle size lying in the range 400 to 600 μm.

The present invention further relates to a method for manufacturing a composite material having a visually grainy appearance comprising the steps of:

- obtaining a powder formed by a plurality of metal particles having a D90 value of a cumulative function of less than 100 μm;
- obtaining ceramic particles, the diameter thereof lying in the range 0.1 to 2 mm;
- mixing the metal powder particles with the ceramic particles to obtain a feedstock, the metal powder representing, in terms of volume fraction, between 50 and 95% of the mixture obtained;
- producing a green body by pressing or by injecting the mixture of metal powder-ceramic particles into a mould;
- subjecting the green body to a sintering treatment at a temperature in the range 600 to 1,400° C. and for a duration in the range 1 h to 4 h to obtain a grey body made of composite material having a visually grainy appearance and comprising a metal matrix which represents, in terms of volume fraction, between 50 and 95% of this grainy composite material, and wherein the ceramic particles are dispersed, the diameter of which particles lies in the range 0.1 to 2 mm and which form the remainder of this grainy composite material.

According to another specific embodiment of the invention, when the metal powder particles are mixed with the ceramic particles to obtain the feedstock, an organic binder is added to the mixture, which binder represents 2 to 40% of the feedstock in terms of volume fraction, the mixture of metal powder particles, ceramic particles and organic binder then being pressed or injected into the mould, then the organic binder being removed from the green body during at least one debinding step.

According to yet another specific embodiment of the invention, the grey body is machined, in particular to reduce the surface roughness.

According to another specific embodiment of the invention, the grey body is ground.

According to another specific embodiment of the invention, the grey body is polished.

According to another specific embodiment of the invention, the grey body is sanded.

According to another specific embodiment of the invention, the grey body is subjected to chemical or electrochemical etching, which has been seen to enable, in particular as a function of the surface condition of the grey body, original aesthetic effects to be obtained, such as an enhanced phase contrast between the metal matrix and the ceramic particles.

Thanks to these features, the present invention provides a composite material which, despite the metal matrix thereof, is resistant to corrosion and is not ferromagnetic. This material is constituted from grains that are visible to the naked eye, which gives it a similar appearance to grainy materials for instance certain rocks such as granite or certain so-called "aesthetic" concretes. Implemented by easy and fast pressing or injection into a mould, this grainy composite material enables decorative elements to be produced such as external parts for watches or jewellery, without limitations as regards shape, and whose appearance and texture are original and resolutely innovative. The production of parts of a horological movement such as plates, bridges or even oscillating weights using the grainy composite material according to the invention can also be considered.

Moreover, the composite material according to the invention is hard, tough and is, as a result of the absence of any polymer material in the composition thereof, able to easily withstand the test of time. In particular, this composite material has low or no sensitivity to the ultraviolet radiation contained in visible light.

BRIEF DESCRIPTION OF THE FIGURES

Other features and advantages of the present invention will be better understood upon reading the following detailed description of various example embodiments of a grainy composite material according to the invention, said examples being provided for the purposes of illustration only and not intended to limit the scope of the invention, given with reference to the accompanying drawing, in which

FIG. 1 represents a sectional view after sanding of a sample obtained by mixing a stainless steel 1.4435 powder with 15 vol % corundum powder having a particle size that lies in the range 297 μm to 420 μm as described herein.

FIG. 2 represents a sectional view after sanding of a sample obtained by mixing a stainless steel 1.4435 powder with 25 vol % corundum powder having a particle size that lies in the range 297 μm to 420 μm as described herein.

FIG. 3 represents a sectional view after sanding of a sample obtained by mixing a stainless steel 1.4435 powder with 15 vol % corundum powder having a particle size that lies in the range 420 μm to 595 μm as described herein.

FIG. 4 represents a sectional view after sanding of a sample obtained by mixing a stainless steel 1.4435 powder 25 vol % corundum powder having a particle size that lies in the range 420 μm to 595 μm as described herein.

FIG. 5 represents a sectional view after sanding of a sample obtained by mixing a grade 2 titanium powder 15 vol % corundum powder having a particle size that lies in the range 297 μm to 420 μm as described herein.

FIG. 6 represents a sectional view after sanding of a sample obtained by mixing a grade 2 titanium powder with 25 vol % corundum powder having a particle size that lies in the range 297 μm to 420 μm as described herein.

FIG. 7 represents a sectional view after sanding of a sample obtained by mixing a grade 2 titanium powder with 15 vol % corundum powder having a particle size that lies in the range 420 μm to 595 μm as described herein.

FIG. 8 represents a sectional view after sanding of a sample obtained by mixing a grade 2 titanium powder with 25 vol % corundum powder having a particle size that lies in the range 420 μm to 595 μm as described herein.

FIG. 9 represents a sectional view after sanding of a sample obtained by mixing a 15% volume fraction of europium- and/or dysprosium-doped strontium aluminate particles as described herein.

DETAILED DESCRIPTION OF ONE EMBODIMENT OF THE INVENTION

The present invention was drawn from the general inventive idea consisting of procuring a hard, tough and durable composite material that is quick and easy to implement. Such a composite material derived from the combination of a metal matrix representing between 50 and 95% of the volume of the material, and ceramic particles representing between 5 and 50% of the volume of the material, enables external elements to be produced, in particular for timepieces and jewellery, without limitations with respect to shape and whose visual appearance is original and innovative. By wisely selecting the elements used in the composition of the composite material according to the invention, the size of the ceramic particles and the volume fraction thereof, in addition to material shaping parameters, a contrast can be obtained between the different phases of the material, which gives the composite material according to the invention an original visual appearance resembling that of certain rocks such as granite or of certain concretes used in the art and construction fields.

Figure 5:
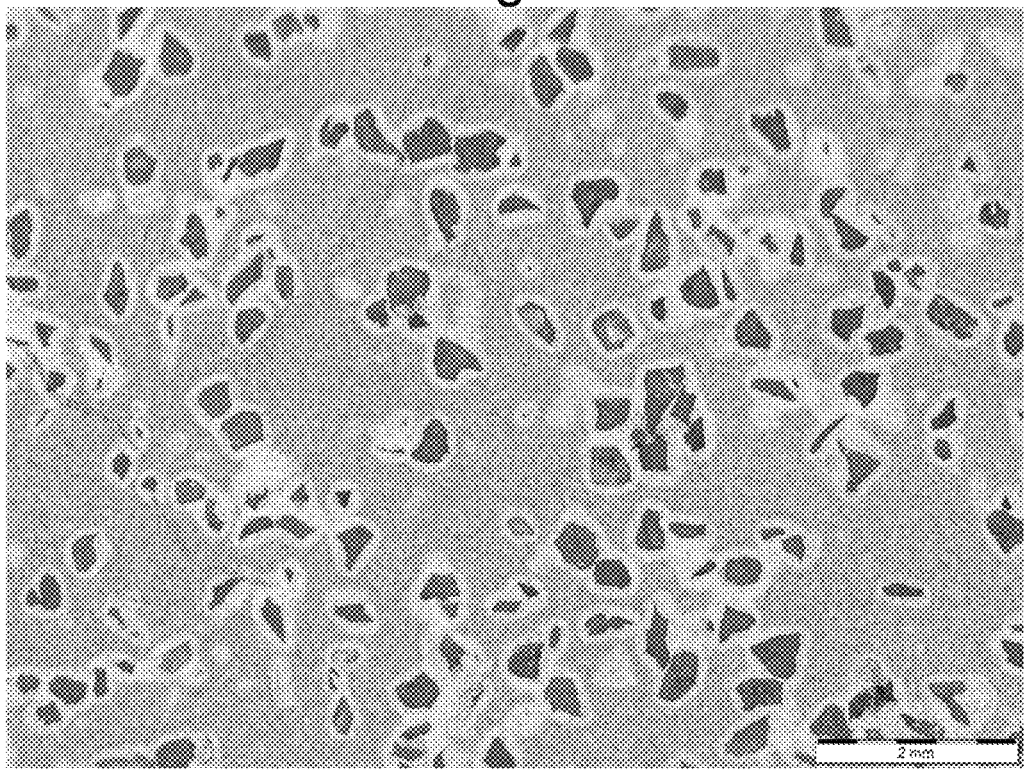
Figure 6:
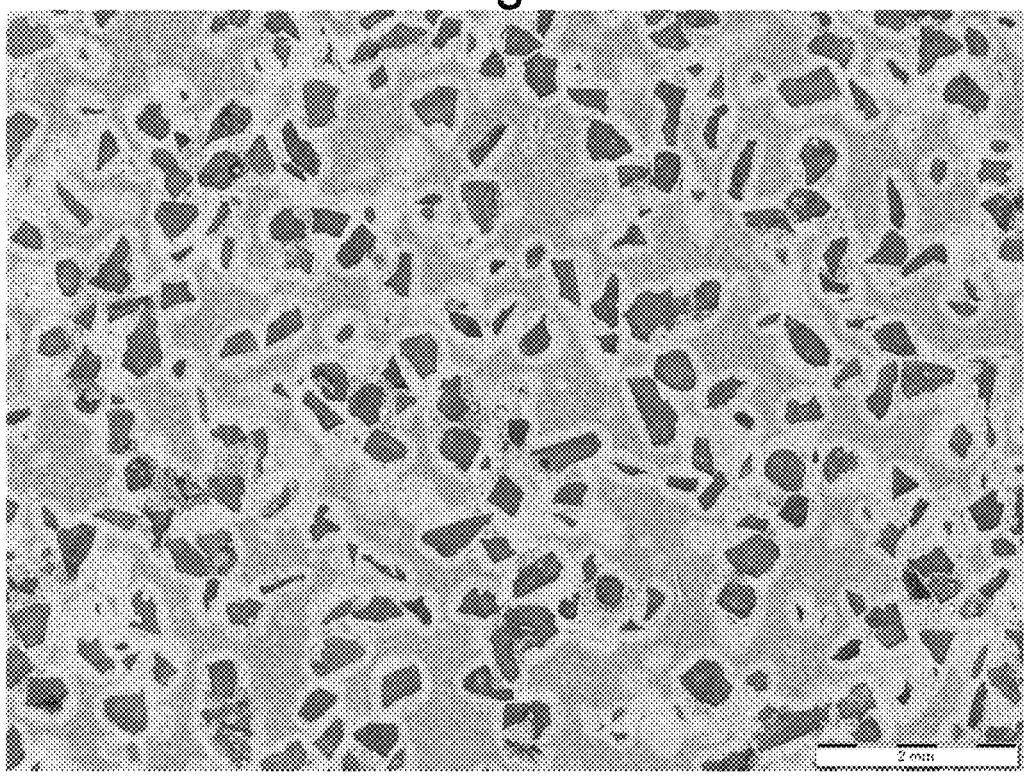
Figure 7:
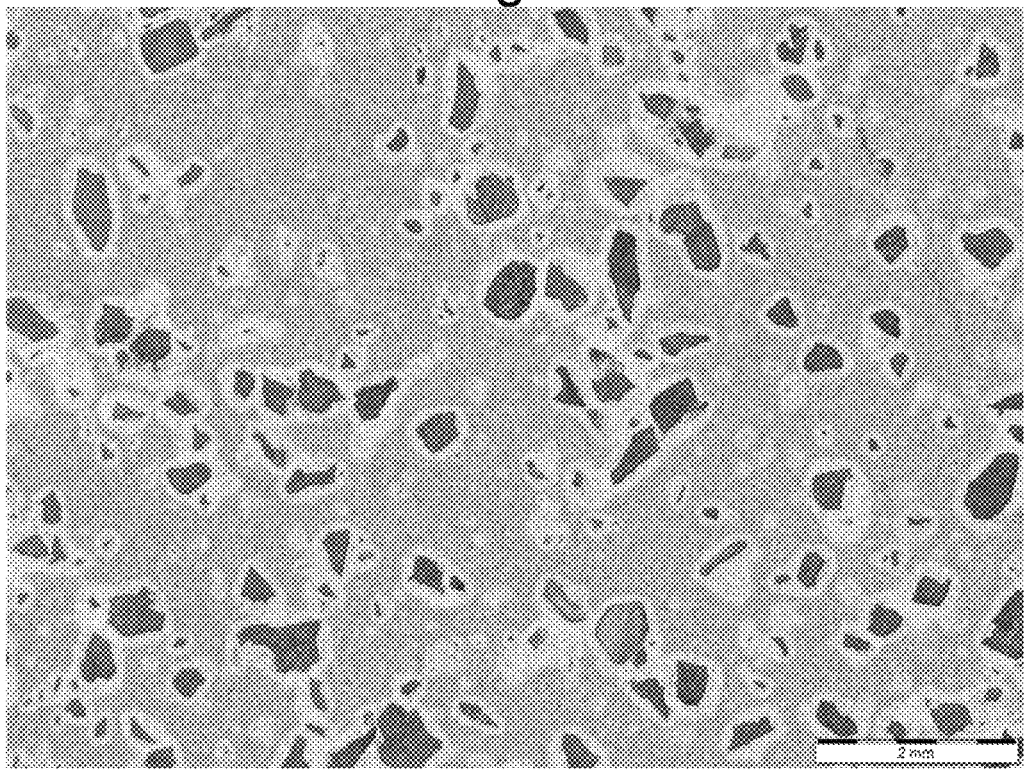
Figure 8:
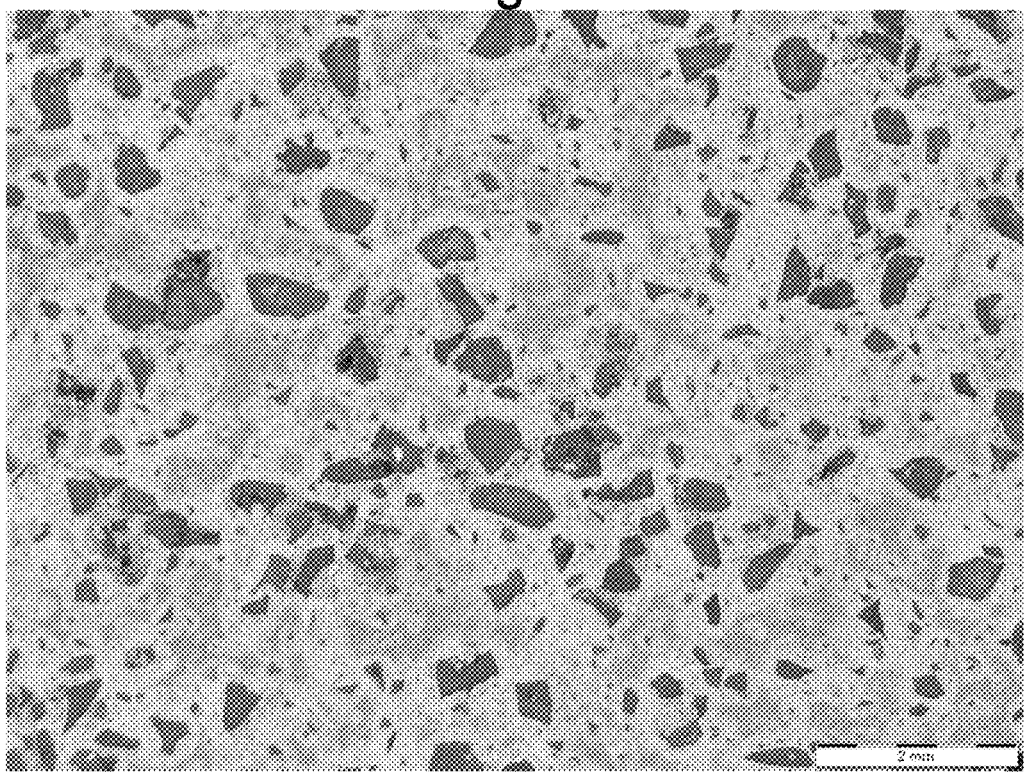

A first example of a composite material according to the invention is obtained by mixing a grade 2 titanium powder with a corundum powder according to different volume fractions and particle sizes. The cumulative function of the titanium powder has a D90 value of less than 25 μm. In other words, 90% of the grade 2 titanium particles that enter into the composition of the material according to the invention have a particle size of less than 25 μm. Four samples of the composite material according to the invention were prepared by mixing the grade 2 titanium powder described hereinabove with respectively:
- 15 vol % corundum having a particle size that lies in the range 297 μm to 420 μm. A sectional view after sanding of a sample prepared under these conditions is shown in FIG. 5.
- 25 vol % corundum having a particle size that lies in the range 297 μm to 420 μm. A sectional view after sanding of a sample prepared under these conditions is shown in FIG. 6.
- 15 vol % corundum having a particle size that lies in the range 420 μm to 595 μm. A sectional view after sanding of a sample prepared under these conditions is shown in FIG. 7.
- 25 vol % corundum having a particle size that lies in the range 420 μm to 595 μm. A sectional view after sanding of a sample prepared under these conditions is shown in FIG. 8.

In the case of these titanium-corundum composite materials sintered under a vacuum for 2 hours at a temperature of 1,100° C., the reaction between the corundum and the titanium reveals, at the interface between the metal matrix and the ceramic particles, a phase alongside the corundum and titanium phases. This third phase is evidenced during sanding and reveals three distinct shades of grey on the composite parts thus obtained.

Figure 1:
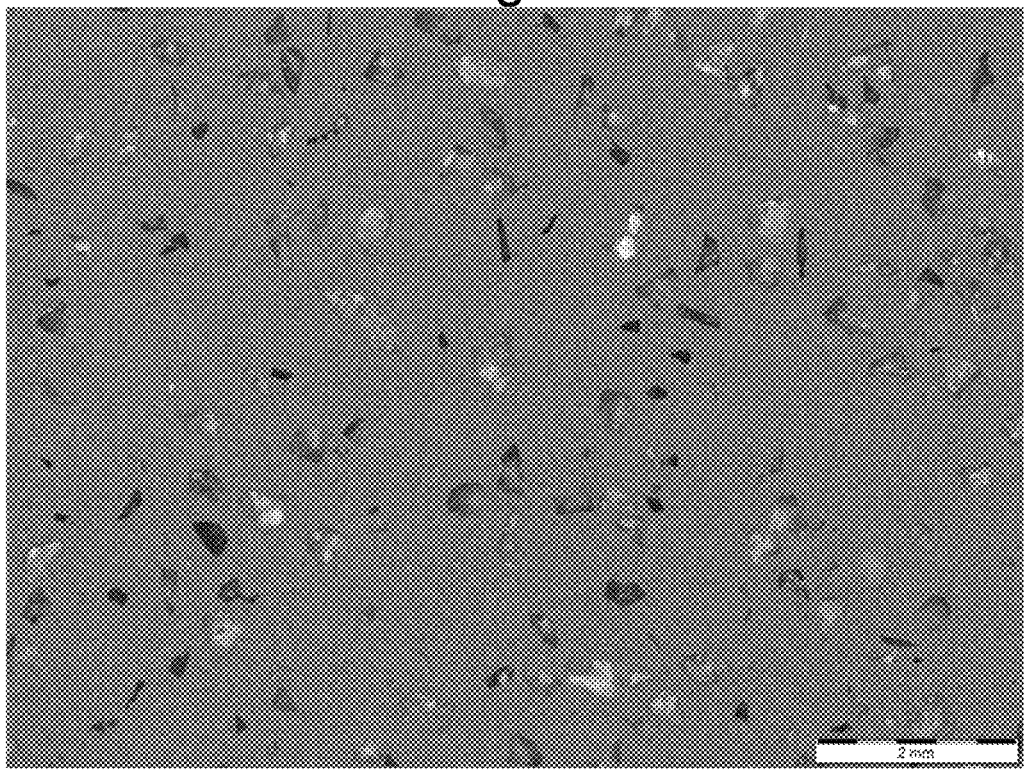
FIGS. 1 to 9 are sectional views of these various example embodiments.
Figure 2:
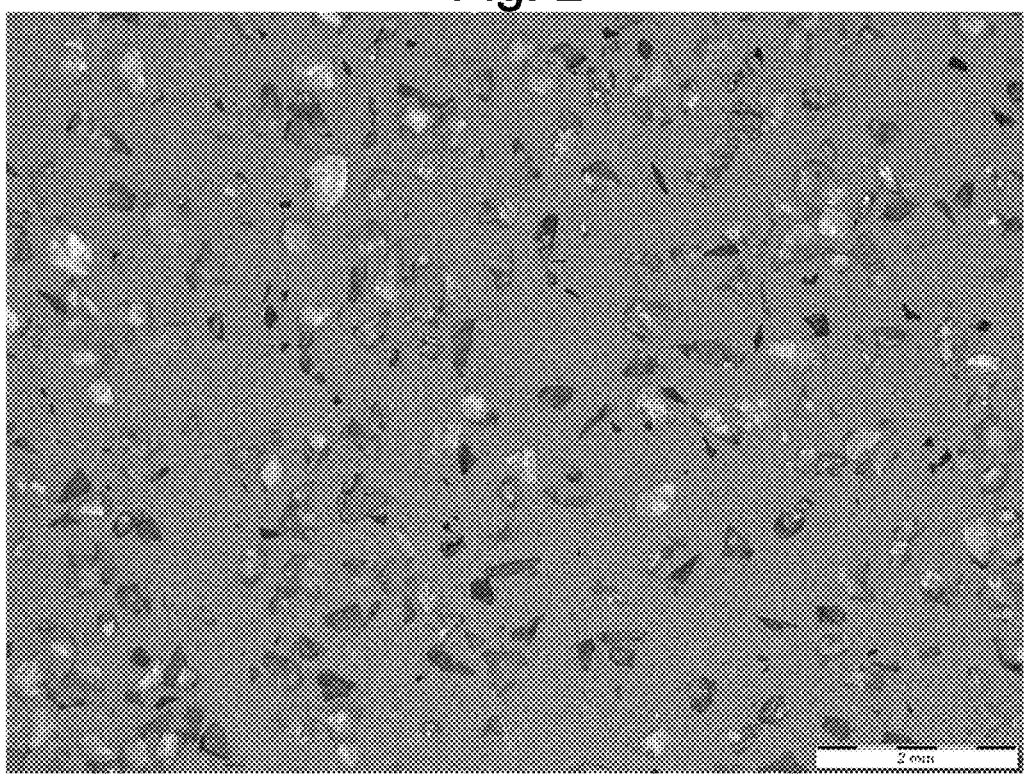
Figure 3:
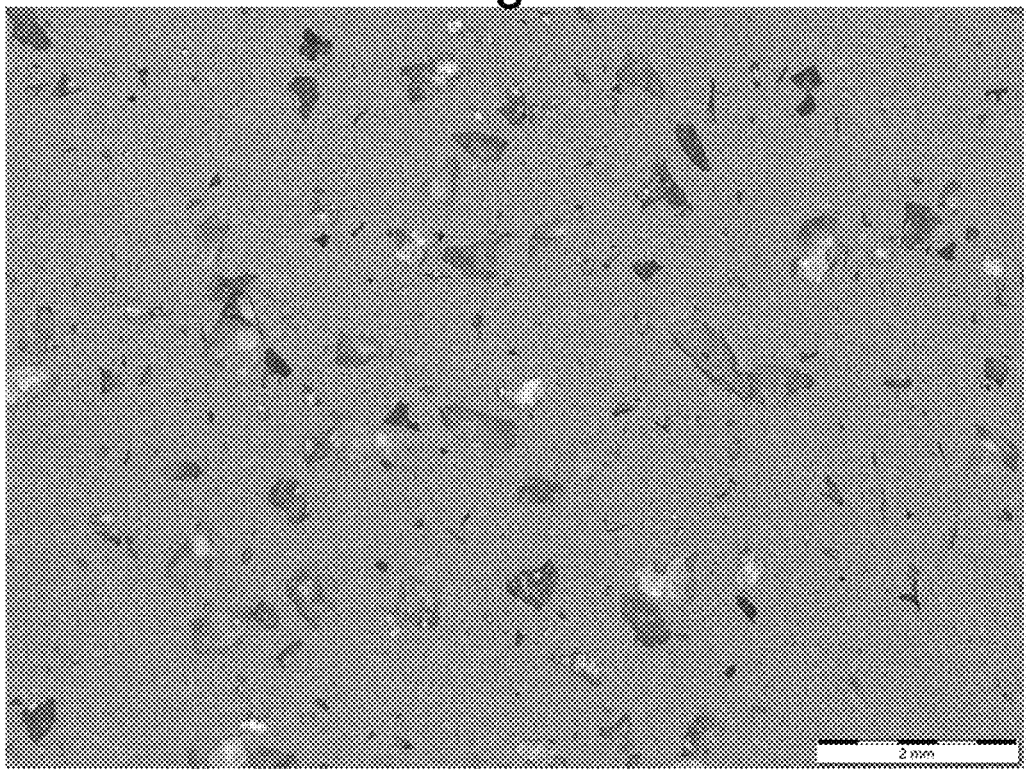
Figure 4:
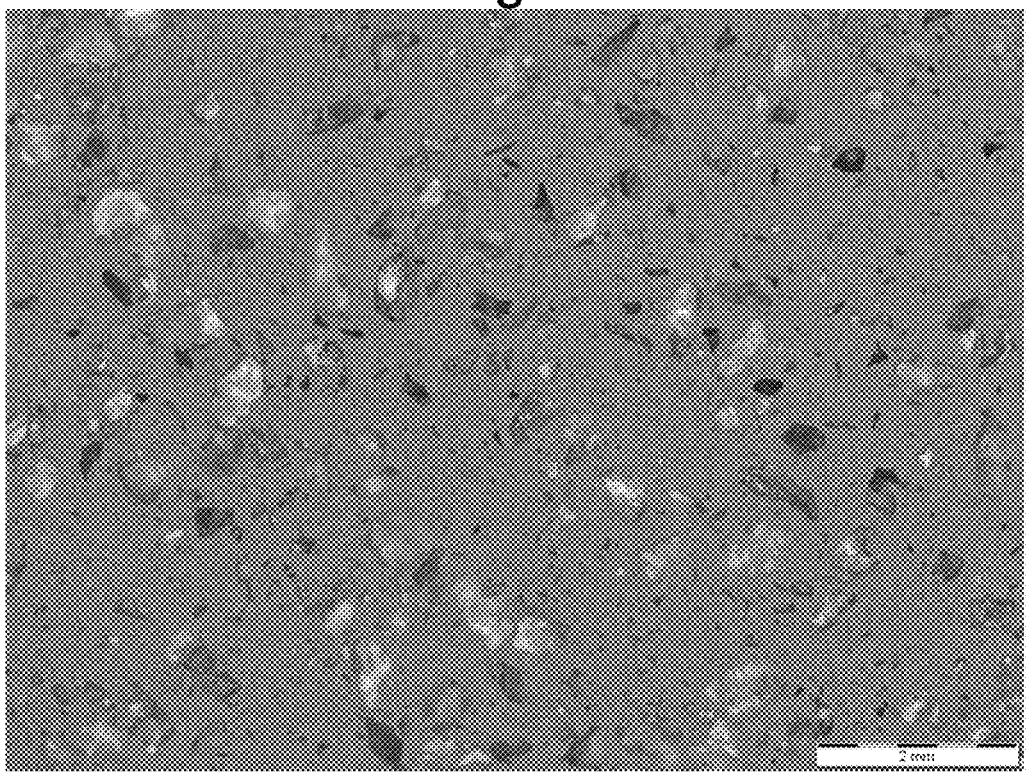

A second example of a composite material according to the invention is obtained by mixing a stainless steel 1.4435 powder with a corundum powder according to different volume fractions and particle sizes. The cumulative function of the stainless steel powder has a D90 value of less than 22 μm. In other words, 90% of the stainless steel 1.4435 particles that enter into the composition of the material according to the invention have a particle size of less than 22 μm. Four samples of the composite material according to the invention were prepared by mixing the stainless steel 1.4435 powder described hereinabove with respectively:
- 15 vol % corundum having a particle size that lies in the range 297 μm to 420 μm. A sectional view after sanding of a sample prepared under these conditions is shown in FIG. 1.
- 25 vol % corundum having a particle size that lies in the range 297 μm to 420 μm. A sectional view after sanding of a sample prepared under these conditions is shown in FIG. 2.
- 15 vol % corundum having a particle size that lies in the range 420 μm to 595 μm. A sectional view after sanding of a sample prepared under these conditions is shown in FIG. 3.
- 25 vol % corundum having a particle size that lies in the range 420 μm to 595 μm. A sectional view after sanding of a sample prepared under these conditions is shown in FIG. 4.

The four above examples of stainless steel-corundum composite materials according to the invention were sintered for 2 hours at a temperature of 1,300° C. and under a neutral argon atmosphere at a pressure of 900 mbar.

In the case of these stainless steel-corundum composite materials sintered under a neutral argon atmosphere, it was observed that, as a function of the temperature and duration of sintering, certain elements of the alloy diffuse in the initially white corundum and give it colours that are aesthetically very interesting. Thus, when chromium diffuses in the corundum, the latter takes on a pink-red colour similar to that of ruby, whereas the diffusion of iron in the corundum gives it a green colour similar to that of green sapphire.

A third example of a composite material according to the invention is obtained by mixing a stainless steel 1.4435 powder with luminescent inorganic particles based on rare earth aluminates, rare earth silicates or even europium- and/or dysprosium-doped strontium aluminates.

Figure 9:
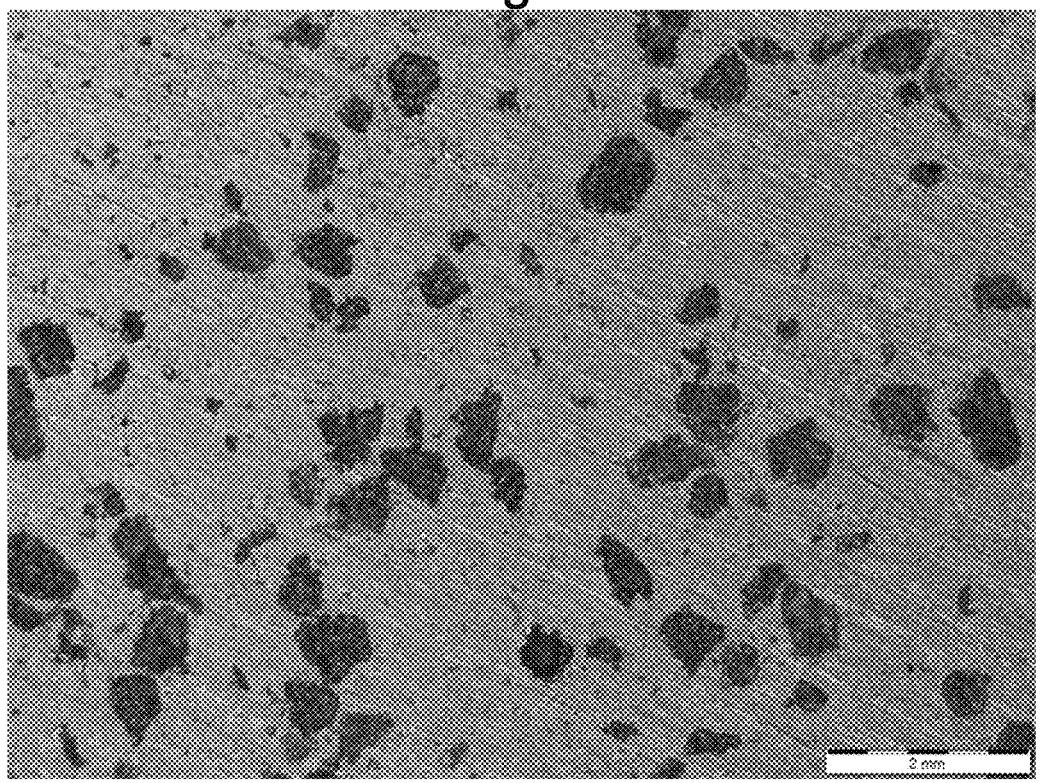

One example of such a material is obtained by mixing a 15% volume fraction of europium- and/or dysprosium-doped strontium aluminate particles. The cumulative function of the stainless steel powder has a cumulative D90 value of less than 22 μm. In other words, 90% of the stainless steel 1.4435 particles that enter into the composition of the material according to the invention have a particle size of less than 22 μm. The europium- and dysprosium-doped strontium aluminate particles have a particle size that lies in the range 400 to 600 μm. This mixture of stainless steel 1.4435 particles and europium- and/or dysprosium-doped strontium aluminate particles was then sintered for 2 hours at a temperature of 1,300° C. and under a neutral argon atmosphere at a pressure of 900 mbar. Surprisingly, after sintering, the doped strontium aluminate particles kept the luminescence effect thereof, which was added to the grainy appearance of the material obtained. A sectional view after sanding of a sample prepared under these conditions is shown in FIG. 9.

It goes without saying that this invention is not limited to the embodiments described above and that various simple alternatives and modifications can be considered by a person skilled in the art without leaving the scope of the invention as defined by the accompanying claims. It should be noted that, in particular, as per the present invention, the term "grainy composite material" is understood to mean a material formed by grains visible to the naked eye. It should also be noted that the ceramic particles dispersed in the metal matrix can all have the same nature or can correspond to at least two different materials. Similarly, the ceramic particles can all be the same size or can be different sizes. It should also be understood that, whereas the purpose of the machining and grinding operations is generally to reduce the surface roughness and give the grey body its final shapes and dimensions, the purpose of the polishing operations and/or sanding operations and/or chemical/electrochemical etching operations is generally to enhance the aesthetic appearance of the final component. More specifically, it has been observed that by applying such polishing/sanding/chemical or electrochemical etching operations to the grey body, a final component is obtained with a greatly improved aesthetic appearance, in particular by revealing the different phases composing this composite material, and by accentuating the contrast between these phases. Finally, it should be noted that a benefit can be drawn from the fact that the matrix of the part made of the grainy composite material according to the invention is metallic, and thus electrically conductive, in order to subject this part to electrodeposition treatment which offers the possibility of selectively coating the metal surfaces of the composite part with a decorative material layer. Similarly, the metal matrix of the grainy composite material part can be anodised in order to colour this metal matrix.

The invention claimed is:

1. A sintered composite material having a grainy appearance, the sintered composite material comprising:
   ceramic particles in a range of from 5 to 50 vol. %; and
   a metal matrix which is in a range of from 50 to 95 vol. % of the sintered composite material, the sintered composite material being a grainy composite material,
   wherein the metal matrix is obtained from a metal powder formed by a plurality of particles having a D90 value of a cumulative function of less than 100 μm,
   wherein the ceramic particles comprise corundum and having a diameter in a range from 0.1 to 2 mm are dispersed in the metal matrix, provide the sintered composite material with a grainy appearance, and form a remainder of the sintered composite material, and
   wherein one or more elements of the metal matrix from metal powder are diffused into the ceramic particles to form infused ceramic particles having a diffused distribution of the one or more elements into the infused ceramic particles.

2. The sintered composite material of claim 1, wherein the diameter of the ceramic particles lies in the range 0.25 to 0.75 mm.

3. The sintered composite material of claim 1, wherein the ceramic particles are present in a range of from 5 to 30 vol. % of the sintered composite material, and
   wherein the ceramic particles have a diameter in a range of from 0.25 to 0.75 mm.

4. The sintered composite material of claim 1, wherein the ceramic particles are present in a range of from 10 to 20 vol. % of the sintered composite material, and
   wherein the ceramic particles have a diameter in a range of from 0.25 to 0.75 mm.

5. The sintered composite material of claim 1, wherein the metal matrix is obtained from a metal powder comprising a mixture of a grade 2 titanium powder formed by particles with a D90 value of a cumulative function of less than 25 μm and of the ceramic particles in volume fractions:
   15 vol % corundum having a particle size in a range of from 297 μm to 420 μm.

6. The sintered composite material of claim 1, wherein the metal matrix comprises an austenitic stainless steel, titanium, gold, silver, platinum, palladium, copper, and/or aluminum.

7. The sintered composite material of claim 1, wherein the ceramic particles further comprise silicon oxide, zirconium oxide, titanium oxide, diamond, silicon carbide, silicon nitride, titanium carbide, titanium boride, and/or zirconium boride.

8. The sintered composite material of claim 1, wherein the diameter of the ceramic particles is in a range of from 0.2 to 2 mm.

9. The sintered composite material of claim 1, wherein the ceramic particles further comprise a silicate.

10. The sintered composite material of claim 1, wherein the metal matrix comprises stainless steel 1.4435 powder formed by particles with a D90 value of a cumulative function of less than 25 μm.

11. The sintered composite material of claim 1, further comprising:
    second ceramic particles that are luminescent inorganic and comprise a rare earth aluminate and/or rare earth silicate.

12. The sintered composite material of claim 1, wherein the infused ceramic particles comprise chromium and have a pink-red color.

13. The sintered composite material of claim 1, wherein the infused ceramic particles comprise iron and have a green color.

14. The sintered composite material of claim 1, wherein the metal matrix is obtained from a metal powder comprising a mixture of a grade 2 titanium powder formed by particles with a D90 value of a cumulative function of less than 25 μm and of the ceramic particles in volume fractions:
    15 vol. % corundum having a particle size in a range of from 420 μm to 595 μm.

15. The sintered composite material of claim 1, wherein the metal matrix is present in a range of from 80 to 90 vol. % of the sintered composite material,
    wherein the ceramic particles are present in a range of from 10 to 20 vol. % of the sintered composite material.

16. The sintered composite material of claim 1, wherein the one or more elements comprise chromium and/or iron.

17. A method for manufacturing the sintered composite material of claim 1, having a visually grainy appearance, the method comprising:
    mixing (a) a powder comprising a plurality of metal particles having a D90 value of a cumulative function of less than 100 μm, with (b) the ceramic particles comprising corundum, having a diameter in a range of from 0.1 to 2 mm, to obtain a feedstock, the metal powder being in a range of from 50 to 95 vol. % of the feedstock;
    producing a green body by pressing or by injecting the metal powder particles-ceramic particles mixture into a mold;
    subjecting the green body to sintering at a temperature in a range of from 600 to 1,400° C. and for a duration in a range of from 1 h to 4 h to obtain a grey body made of composite material having a visually grainy appearance and comprising a metal matrix which is in a range of from 50 to 95 vol. % of the grey body, and diffusing one or more elements of the metal matrix into the ceramic particles to form infused ceramic particles comprising the one or more elements diffused therein,
    wherein the ceramic particles are dispersed and form a remainder of the grey body.

18. The method of claim 17, wherein, when the metal powder particles are mixed with the ceramic particles to obtain the feedstock, an organic binder is added to the mixture,
    wherein the organic binder is in a range of from 2 to 40 vol. % of the feedstock,
    wherein the mixture of metal powder particles, ceramic particles, and organic binder are then pressed or injected into the mold, then the organic binder is removed from the green body during at least one debinding.

19. The method of claim 17, wherein the grey body is machined to reduce the surface roughness.

20. The method of claim 19, wherein the grey body is ground or sanded.

21. The method of claim 19, wherein the grey body is polished.

22. The method of claim 19, further comprising:
subjecting the grey body to chemical or electrochemical etching, thereby revealing different phases composing the composite material, and enhancing contrast between the different phases.

23. The method of claim 19, further comprising:
subjecting the grey body to an electrode position treatment or to an anodizing treatment.

* * * * *